United States Patent [19]
Yano et al.

[11] Patent Number: 5,113,704
[45] Date of Patent: May 19, 1992

[54] GEAR TESTER

[75] Inventors: Mitsuru Yano, Fukuoka; Yasusro Yoshihara, Kitakyusyu, both of Japan

[73] Assignees: Hitachi Metals, Ltd., Tokyo; Nishinihon Kogyo Co., Ltd., Fukuoka, both of Japan

[21] Appl. No.: 656,331

[22] Filed: Feb. 19, 1991

[30] Foreign Application Priority Data

Feb. 19, 1990 [JP] Japan .................................. 2-37860

[51] Int. Cl.$^5$ .......................................... G01M 13/02
[52] U.S. Cl. ................................. 73/162; 33/501.13
[58] Field of Search ..................... 73/162; 33/501.13

[56] References Cited

U.S. PATENT DOCUMENTS

| | | | |
|---|---|---|---|
| 3,405,557 | 10/1968 | Sinke, Jr. .......................... | 73/162 X |
| 3,534,482 | 10/1970 | Stepanek et al. .................. | 33/501.13 |
| 3,580,068 | 5/1971 | Hoodwin ............................. | 73/162 |
| 3,583,072 | 6/1971 | Muller ................................ | 33/501.13 |
| 3,796,092 | 1/1992 | Klinger et al. ..................... | 73/162 |

FOREIGN PATENT DOCUMENTS

| | | | |
|---|---|---|---|
| 0697586 | 9/1940 | Fed. Rep. of Germany ........ | 73/162 |
| 64-2139 | 1/1989 | Japan . | |
| 0276040 | 11/1989 | Japan .................................... | 73/162 |

Primary Examiner—Daniel M. Yasich
Attorney, Agent, or Firm—Sughrue, Mion, Zinn, Macpeak & Seas

[57] ABSTRACT

The gear tester includes (a) a first driving shaft driven by a motor and having a first driving gear fixed thereto; (b) a second driving shaft parallel with the first driving shaft and having a second driving gear fixed thereto; (c) a pair of intermediate gears meshing with each other, via which the first and second driving shafts are operably connected to each other; (d) a frame rotatably supporting the pair of intermediate gears, the frame being movable in a transverse direction so that a rotation phase difference is generated between the first and second driving gears depending upon the movement of the frame; and (e) a pair of test gears meshing with each other, one of which is fixed to the first driving shaft and the other of which is fixed to the second driving shaft. By moving the frame, a torque load is applied to test gears.

5 Claims, 3 Drawing Sheets

GEAR TESTER

BACKGROUND OF THE INVENTION

The present invention relates to a power transmission-type gear tester.

Conventional power transmission-type gear testers for testing the bending strength, surface pressure resistance, scoring, etc. of gear teeth are constituted by a pair of driving gears and a pair of test gears, both of which have the same parameters such as tooth number, tooth profile, etc.

However, when test gear modules or their tooth numbers are changed in such gear testers, the driving gears should also be changed to those having the same parameters as those of new test gears. In addition, whenever new gears are tested, the driving gear boxes and test gear boxes should be exchanged to new ones having the sizes corresponding to the new driving gears and test gears. It is apparent that this is economically disadvantageous.

To obviate this disadvantage, Japanese Utility Model Laid-Open No. 64-2139 discloses a power transmission-type gear tester comprising a pair of transmission gear boxes each having a pair of transmission gears for constituting a power-circulating loop, and a pair of test gears provided in the power-circulating loop. Specifically, one transmission gear in each transmission gear box is connected to a torsion bar to which a torque load-applying device is mounted, and another transmission gear in each transmission gear box is connected via a torque detector to a test gear box in which test gears are provided.

In this gear tester, a torque load is applied to the torsion bar in a state where a motor is stopped. After detaching the torque load-applying device from the torsion bar, the motor is operated to carry out the testing of gears. Accordingly, when new gears having different parameters are tested, only the test gears should be changed without changing the transmission gears. In this sense, this gear tester is economically advantageous. In addition, this gear tester can be used for testing small gears.

However, since the testing of gears is conducted in this gear tester in a state where a torque load is applied to the torsion bar in advance, it is impossible to start the test from a state where there is no torque applied to the test gear. Also, the torque load cannot be changed during the continuous operation for testing. Accordingly, to change the torque load, the operation should be stopped.

In addition, in the case of exchanging test gears to new ones, the new test gears should be fixed to gear shafts at such a relative rotational angle that a pair of new test gears mesh with each other with no resistance. Incidentally, when two gears are meshing with each other without resistance, it is defined herein that there is no rotation phase difference between the two gears. Here, the term "without resistance" means that the meshing of the two gears is in an optimum state.

The meshing of the two gears without resistance would not easily be achieved by adjusting key positions for fixing the test gears to the gear shafts. Accordingly, couplings of the gear shafts are in fact adjusted for achieving no rotation phase difference between a pair of test gears. This not only lengthens the test start-up time, but also makes it difficult to improve the test accuracy and reliability.

OBJECT AND SUMMARY OF THE INVENTION

Accordingly, an object of the present invention is to provide a power transmission-type gear tester which can be started from a state in which there is no torque load, and which can carry out a test at any desired torque load without requiring long start-up time.

Thus, the power transmission-type gear tester according to the present invention comprises:

(a) a first driving shaft driven by a motor and having a first driving gear fixed thereto;

(b) a second driving shaft parallel with the first driving shaft and having a second driving gear fixed thereto;

(c) a pair of intermediate gears meshing with each other, via which the first and second driving shafts are operably connected to each other;

(d) a frame rotatably supporting the pair of intermediate gears, the frame being movable in a transverse direction so that a rotation phase difference is generated between the first and second driving gears depending upon the movement of the frame; and (e) a pair of test gears meshing with each other, one of which is fixed to the first driving shaft and the other of which is fixed to the second driving shaft.

DETAILED DESCRIPTION OF THE PREFERRED EMBODIMENT

Figure 1:
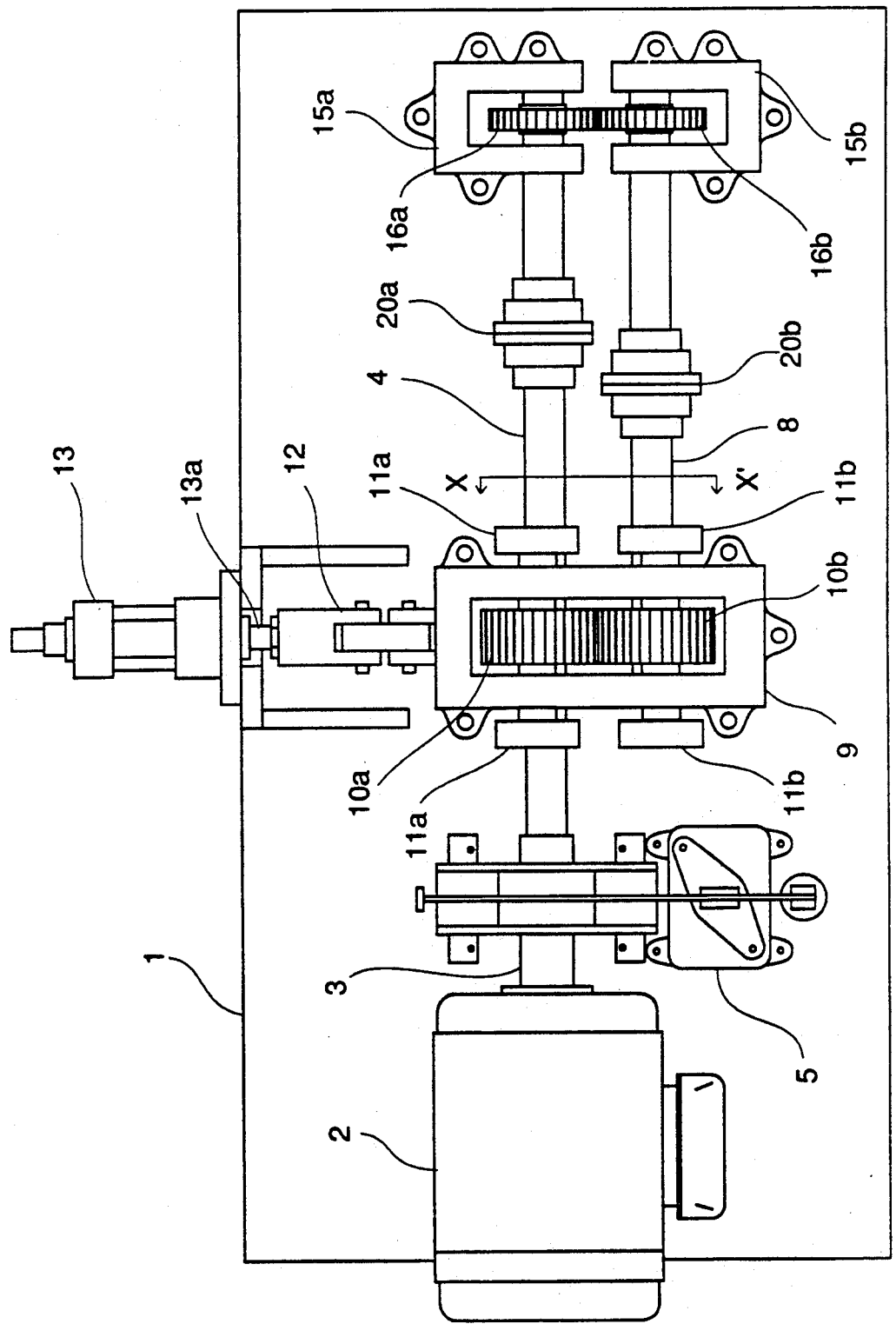
FIG. 1 is a plan view showing a power transmission-type gear tester according to one embodiment of the present invention.
Figure 2:
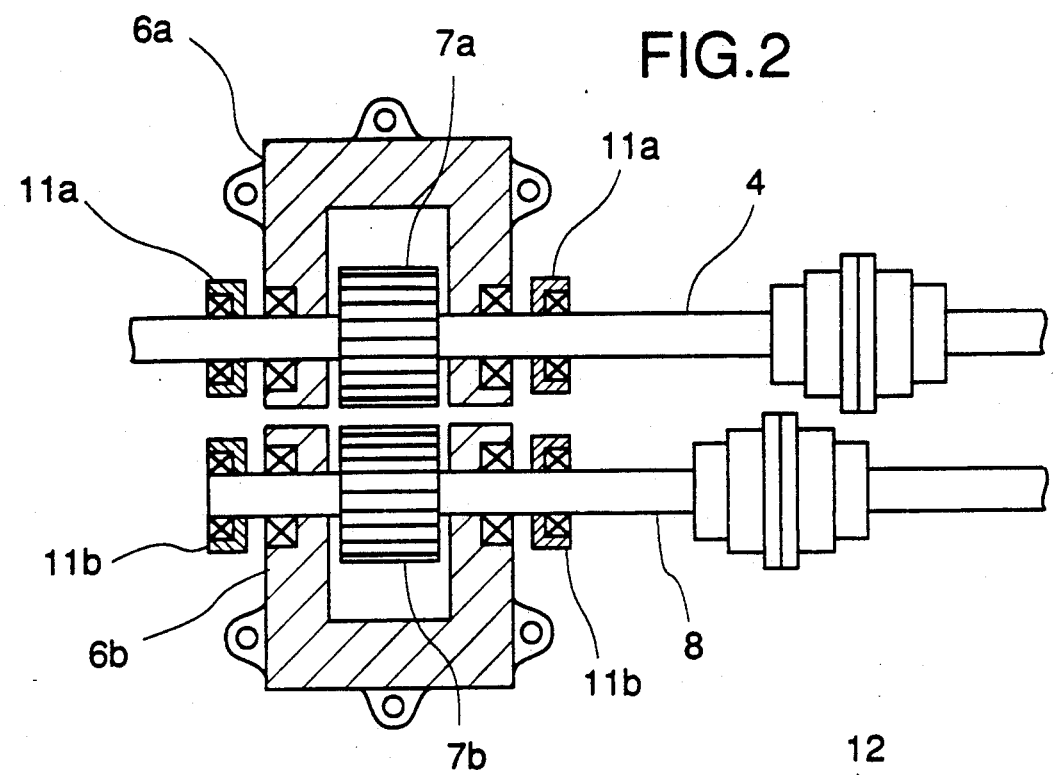
FIG. 2 is a horizontal cross-sectional view showing a pair of driving gears in the power transmission-type gear tester in FIG. 1.

Referring to FIG. 1, the power transmission-type gear tester according to one embodiment of the present invention comprises a base 1, a motor 2 fixed to the base 1, a main shaft 3 connected to the motor 2, a first driving shaft 4 connected to the main shaft 3 via an electromagnetic brake 5. As shown in FIG. 2, a pair of driving gear boxes 6a, 6b are fixed to the base 1 by bolts, etc., in such a manner that each driving gear box 6a, 6b is adjustable in a transverse direction (in perpendicular to the driving shaft 4 on the surface of the base 1). When the bolts are used, the base 1 should have elongated apertures extending in a transverse direction so that the driving gear boxes 6a, 6b can be fixed at any desired transverse positions. The driving gear box 6a has a driving gear 7a fixed to the first driving shaft 4, and the second driving gear box 6b has a second driving gear 7b fixed to a second driving shaft 8. Both driving gears 7a, 7b are separate from each other.

Figure 3:
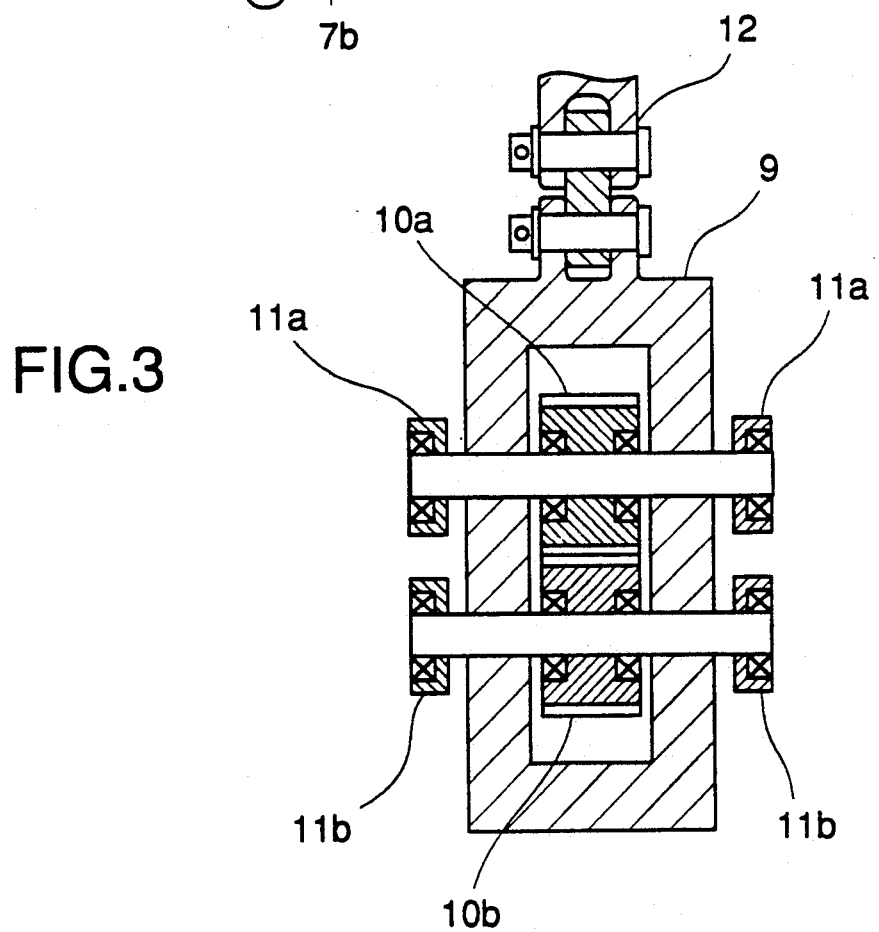
FIG. 3 is a horizontal cross-sectional view showing a pair of intermediate gears in the power transmission-type gear tester in FIG. 1.
Figure 4:
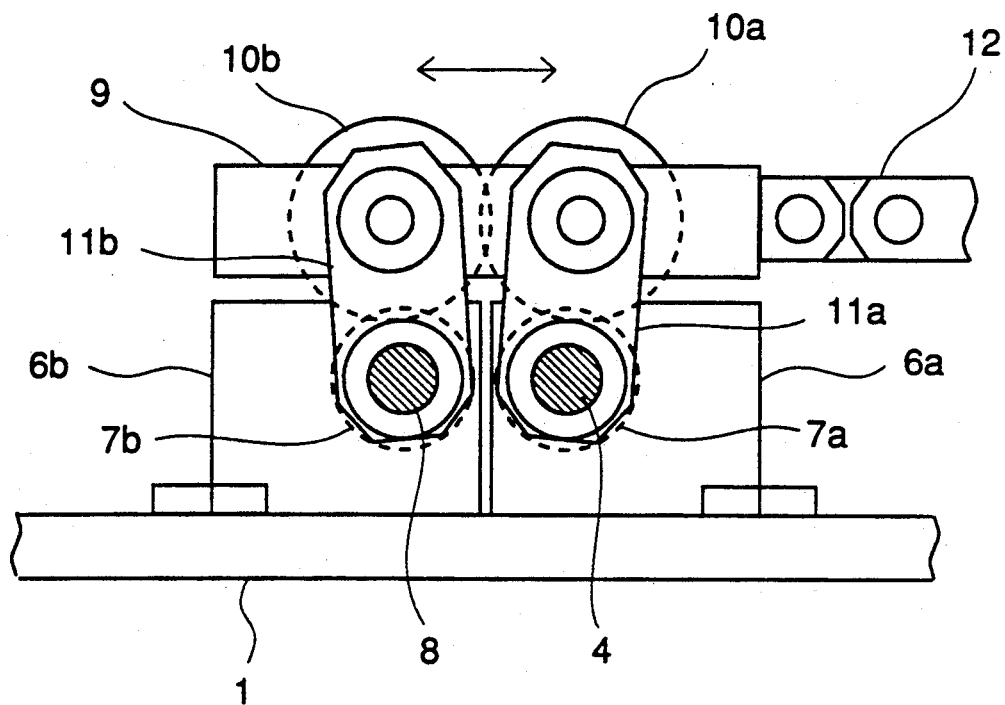
FIG. 4 is a view taken along the line X—X'.

Provided above the driving gear boxes 6a, 6b is a frame 9 supported by a support member (not shown) in a horizontally movable manner. The frame 9 has a pair of intermediate gears 10a, 10b rotatably supported thereby. As shown in FIGS. 2-4, a first link member 11a is provided between the first driving shaft 4 and a shaft of the first intermediate gear 10a, and a second link member 11b is provided between the second driving shaft 8 and a shaft of the second intermediate gear 10b, so that the distance between the first driving gear 7a and the first intermediate gear 10a and the distance between the second driving gear 7b and the second intermediate gear 10b are kept constant.

The frame 9 is connected via a flexible link member 12 to a rod 13a of a horizontal reciprocating hydraulic cylinder 13. The flexible link member 12 permits the frame 9 to move up and down to some extent in addition to the horizontal movement.

As shown in FIGS. 2-4, the first driving gear 7a, the first intermediate gear 10a, the second intermediate gear 10b and the second driving gear 7b are meshing with each other in this order, so that the rotation of the first driving gear 7a is transmitted to the second driving gear 7b via a pair of the intermediate gears 10a, 10b. In a preferred embodiment, both driving gears 7a, 7b have the same parameters. In this case, gears having the same parameters can be tested. For simplifying the structure of the gear tester, it is preferable that both intermediate gears 10a, 10b also have the same parameters.

One end of the first driving shaft 4 is rotatably supported by a test gear box 15a, and one end of the second driving shaft 8 is rotatably supported by a test gear box 15b. Both test gear boxes 15a, 15b are fixed to the base 1 by bolts, etc., in such a manner that they are adjustable in a transverse direction. The fixing of the test gear boxes 15a, 15b to the base 1 can be achieved in the same manner as in the case of the driving gear boxes 6a, 6b. Both driving shafts 4, 8 are provided with fly wheels 20a, 20b, between the driving gear boxes 6a, 6b and the test gear boxes 15a, 15b.

The test gear box 15a rotatably supports the first driving shaft 4 to which a test gear 16a is fixed, and the test gear box 15b rotatably supports the second driving shaft 8 to which a test gear 16b is fixed. As described above, the transverse positions of the test gear boxes 15a, 15b are adjustable such that the test gears 16a, 16b can mesh with each other without resistance.

In this gear tester, the testing of gears 16a, 16b is conducted as follows: At the time of starting the test, the rod 13a of the horizontal cylinder 13 is in a retracted position (original position). In this state, there is no rotation phase difference between the first and second driving gears 7a, 7b, and thus between the two test gears 16a, 16b. Accordingly, the test gears 16a, 16b are rotatable while meshing with each other without resistance.

Figure 5:
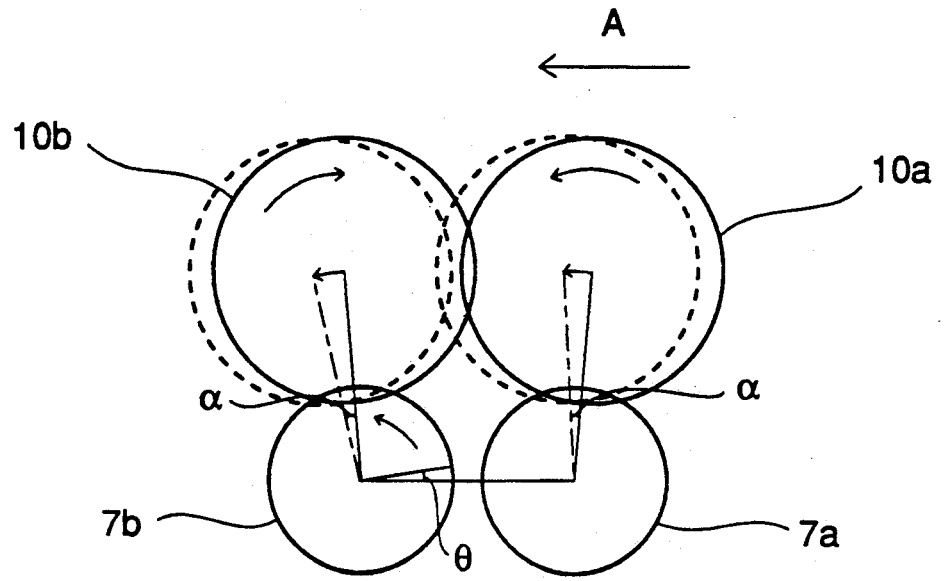
FIG. 5 is a schematic view showing the mechanism of generating a rotation phase difference between two driving gears by the lateral movement of intermediate gears according to the present invention.

Next, the rod 13a of the horizontal reciprocating hydraulic cylinder 13 is projected to push the frame 9 horizontally. As shown in FIG. 5, when the frame 9 moves horizontally as shown by the arrow A, both intermediate gears 10a, 10b also move by the same distance. In this case, it is understood from FIG. 5 that since a center of the first intermediate gear 10a moves by an angle "α" with respect to the first driving gear 7a, the first intermediate gear 10a rotates by a corresponding angle relative to the first driving gear 7a. In a case where both intermediate gears 10a and 10b meshing with each other have the same parameters, the second intermediate gear 10b rotates by the same phase angle in an opposite direction. This in turn leads to the rotation of the second driving gear 7b in a direction shown in FIG. 5. As a result, a rotation phase difference θ is generated between the driving gears 7a, 7b. It should be noted that the degree of a rotation phase difference between the two driving gears 7a, 7b can be changed by adjusting the distance by which the rod 13a is projected horizontally.

When there is a rotation phase difference between the two driving gears 7a, 7b, it is transmitted to the test gears 16a, 16b. Thus, stress (torque load) is applied to the gear teeth of the test gears 16a, 16b. This torque load is proportional to the rotation phase difference between the driving gears 7a, 7b. Accordingly, the torque load applied to the gear teeth of the test gears 16a, 16b can be adjusted by the horizontal movement of the frame 9.

When the test gears 16a, 16b are exchanged to new ones, the distance between the two driving gear boxes 6a, 6b and the distance between the test gear boxes 15a, 15b are changed such that new test gears can mesh with each other without resistance. In this state, the rod 13a of the horizontal hydraulic cylinder 13 is projected to move the frame 9 horizontally. By this movement of the frame 9, a rotation phase difference is given to the driving shafts 4, 8, which in turn gives a torque load to the new test gears 16a, 16b. In this case, too, the torque load applied to the test gears 16a, 16b can be changed by adjusting the horizontal movement of the frame 9.

As described above in detail, since a pair of test gears are fixed to driving shafts which are fixed to a pair of driving gears operably connected to each other via a pair of intermediate gears, and since the intermediate gears are rotatably fixed to the frame which is movable in a transverse direction, any gears having different parameters can be tested at any torque load. Accordingly, the testing of gears can be started from a state in which there is no torque load and conducted even to a state in which gear teeth are broken, simply by adjusting the horizontal movement of the frame. Also, since the distance between the two driving shafts can be adjusted freely, the fixing of the test gears to the driving shafts at optimum rotational positions by keys can be easily achieved.

In addition, by changing the horizontal movement of the rod 13a in an opposite direction, the torque load can be reversed to evaluate various properties of the gears.

The gear tester according to the present invention is effective in reducing the test start-up time and improving the test accuracy in a wide range of a torque load.

What is claimed is:

1. A gear tester comprising:
    (a) a first driving shaft driven by a motor and having a first driving gear fixed thereto;
    (b) a second driving shaft parallel with said first driving shaft and having a second driving gear fixed thereto;
    (c) a pair of intermediate gears meshing with each other, via which said first and second driving shafts are operably connected to each other;
    (d) a frame rotatably supporting said pair of intermediate gears, said frame being selectively movable horizontally in a transverse direction by a pushing force so that a rotation phase difference is generated between said first and second driving gears depending upon the movement of said frame; and
    (e) a pair of test gears meshing with each other, one of which is fixed to said first driving shaft and the other of which is fixed to said second driving shaft, to attendantly apply a torque load to said test gears when said frame is moved by said pushing force to thereby test various properties of said test gears.

2. The gear tester according to claim 1, wherein said first and second driving gears are rotatably supported by first and second driving gear boxes fixed to a base at positions adjustable in a transverse direction, and said pair of test gears are rotatably supported by a pair of test gear boxes fixed to said base at positions adjustable in a transverse direction, to thereby accommodate test gears of various sizes.

3. The gear tester according to claim 1, wherein a first link member is provided between said first driving shaft and a shaft of said first intermediate gear so as to keep a constant distance between said first driving gear and said first intermediate gear, and a second link member is provided between said second driving shaft and a shaft of said second intermediate gear so as to keep a constant distance between said second driving gear and said second intermediate gear.

4. The gear tester according to claim 1, wherein said frame is connected to a rod of a hydraulic cylinder via a flexible link member to thereby apply said pushing force.

5. The gear tester according to claim 1, wherein said first and second driving gears have the same tooth number and tooth profile, and said first and second intermediate gears have the same tooth number and tooth profile, in order to test a pair of gears having the same tooth number and tooth profile.

* * * * *